United States Patent
Piechocki et al.

[11] Patent Number: 6,156,806
[45] Date of Patent: Dec. 5, 2000

[54] HIGH INTERNAL PHASE RATIO EMULSIONS AND STABLE AQUEOUS DISPERSIONS OF HYDROXY-FUNCTIONAL POLYMERS

[75] Inventors: Christian Piechocki, Marienthal, France; James E. Pate, Sanford; Michael N. Mang, Midland, both of Mich.; Jerry E. White, Lake Jackson, Tex.; Dale C. Schmidt, Midland, Mich.

[73] Assignee: The Dow Chemical Company, Midland, Mich.

[21] Appl. No.: 09/140,055

[22] Filed: Aug. 26, 1998

Related U.S. Application Data

[60] Provisional application No. 60/058,067, Sep. 5, 1997.

[51] Int. Cl.[7] ................. B01F 3/08; C09K 3/00; C08K 3/20
[52] U.S. Cl. ................. 516/64; 516/66; 516/77; 516/926; 516/928; 523/502; 526/939
[58] Field of Search ................. 516/64, 66, 77, 516/926, 928; 523/502; 526/939

[56] References Cited

U.S. PATENT DOCUMENTS

| | | |
|---|---|---|
| 3,360,599 | 12/1967 | Nyberg et al. |
| 3,503,917 | 3/1970 | Burke . |
| 4,018,426 | 4/1977 | Mertz et al. |
| 4,123,403 | 10/1978 | Warner et al. |
| 5,037,864 | 8/1991 | Anand et al. |
| 5,164,472 | 11/1992 | White et al. |
| 5,171,820 | 12/1992 | Mang et al. ................. 528/87 |
| 5,250,576 | 10/1993 | DesMarais et al. |
| 5,275,853 | 1/1994 | Silvis et al. |
| 5,496,910 | 3/1996 | Mang et al. ................. 528/88 |
| 5,539,021 | 7/1996 | Pate et al. |
| 5,665,786 | 9/1997 | Xu et al. ................. 521/84.1 |
| 5,686,551 | 11/1997 | White et al. ................. 528/101 |
| 5,780,582 | 7/1998 | Wang et al. ................. 528/365 |
| 5,814,373 | 9/1998 | White et al. ................. 427/386 |
| 5,821,286 | 10/1998 | Xu et al. ................. 524/47 |
| 5,834,078 | 11/1998 | Cavitt et al. ................. 428/35.7 |
| 5,852,078 | 12/1998 | Willett et al. ................. 524/35 |
| 5,852,163 | 12/1998 | Chen et al. ................. 528/274 |
| 5,861,216 | 1/1999 | Doane et al. ................. 428/532 |

FOREIGN PATENT DOCUMENTS

WO 96/39461  12/1996  WIPO .

OTHER PUBLICATIONS

Reinking, et al., Journal of Applied Polymer Science, "Polyhydroxyethers.I. Effect of Structure on Properties of High Molecular Weight Polymers from Dihydric Phenols and Epichlorohydrin," vol. 7, pp. 2135–2144 (1963)

*Primary Examiner*—Jill Warden
*Assistant Examiner*—Monique T. Cole
*Attorney, Agent, or Firm*—Reid S. Willis

[57] ABSTRACT

The present invention is a composition comprising either: a) a high internal phase ratio emulsion having water as a continuous phase and a thermoplastic hydroxy-functional polyether as a disperse phase; or b) a stable aqueous dispersion of the thermoplastic hydroxy-functional polyether. The composition of the present invention addresses a need in the art by providing a thermoplastic coating that exhibits an excellent barrier to oxygen and carbon dioxide, but which barrier properties are not adversely affected by contact with water. The composition is particularly useful in the paper packaging industry where biodegradability and resistance to spoilage of food is desirable.

12 Claims, 1 Drawing Sheet

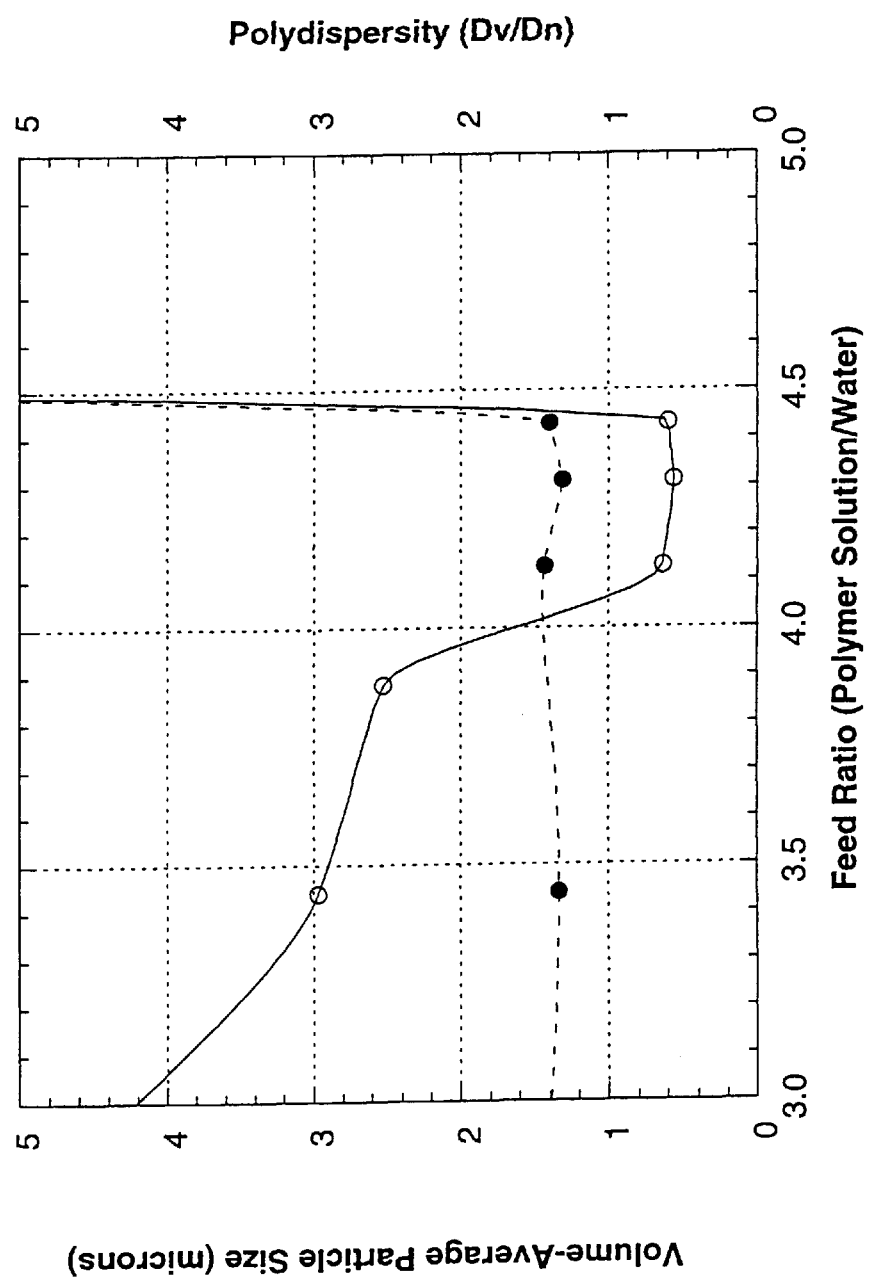

HIGH INTERNAL PHASE RATIO EMULSIONS AND STABLE AQUEOUS DISPERSIONS OF HYDROXY-FUNCTIONAL POLYMERS

CROSS-REFERENCE TO RELATED APPLICATION

This application claims the benefit of U.S. Provisional Application No. 60/058,067 filed Sep. 5, 1997.

BACKGROUND OF THE INVENTION

The present invention relates to high internal phase ratio (HIPR) emulsions and stable aqueous dispersions of hydroxy-functional polymers.

In paper packaging applications, it is desirable to provide barriers against water, oxygen, and carbon dioxide. Wettability of a paper surface can be reduced using sizing agents, while gas barriers can be formed by coating the paper with a continuous film of a suitable material. Examples of such barrier-producing films are paraffin wax, polyethylene, ethylene-vinyl acetate copolymer, and poly(vinylidene chloride) (PVDC). Of these, PVDC has the best water-, vapor-, and oxygen-barrier properties. Moreover, unlike other high oxygen-barrier materials, PVDC is almost insensitive to water. However, because of its high chlorine content, PVDC tends to corrode processing equipment, which increases manufacturing costs.

It would be an advantage in the art to prepare a non-chlorine-containing latex that can be used to make a coating that is effective as a barrier against small molecules, but which barrier properties are not adversely affected by contact with water. It would be further advantageous if the coating adhered to a substrate without the aid of an ancillary adhesive. It would be desirable for some applications that this coating be biodegradable, so that the product can be composted subsequent to its intended use.

SUMMARY OF THE INVENTION

The present invention is a composition comprising either: a) an HIPR emulsion having water as a continuous phase and a thermoplastic hydroxy-functional polyether as a disperse phase; or b) a stable aqueous dispersion of the thermoplastic hydroxy-functional polyether, wherein the hydroxy-functional polyether has structural units represented by either of the formulae:

$$\left[ \begin{matrix} O & O \\ \| & \| \\ OC-R^1-COR^3OR^4O-R^3 \end{matrix} \right] \quad \text{I}$$

or

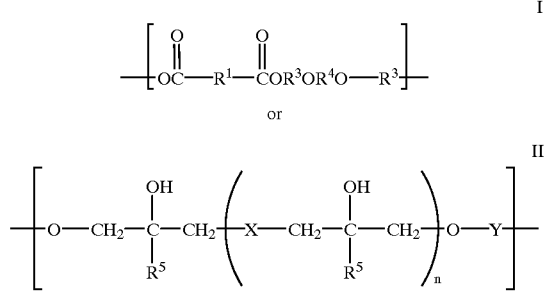

where $R^1$ is predominantly a hydrocarbylene moiety; $R^5$ is independently in each occurrence hydrogen or alkyl; n is 0 or 1; $R^3$ is

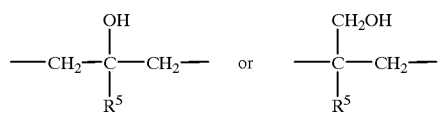

and $R^4$ is

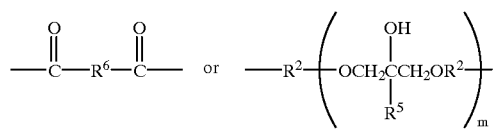

where $R^2$ is predominantly a hydrocarbylene moiety or

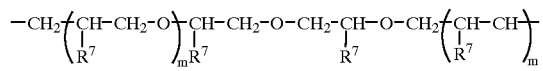

where $R^6$ is predominantly a hydrocarbylene moiety; $R^7$ is independently in each occurrence hydrogen or methyl; X is

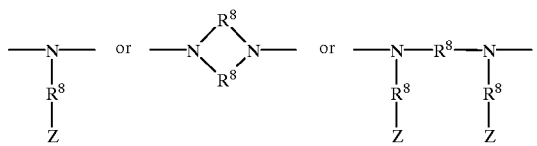

wherein $R^8$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano; Y is predominantly a hydrocarbylene moiety; and each m is independently an integer from about 0 to 100.

In a second aspect, the present invention is a method of preparing a stable aqueous dispersion of a hydroxy-functional polyether comprising the steps of:

a) dissolving the hydroxy-functional polyether in a solvent or melting the polyether to form a solution or a melt that is, sufficiently immiscible with water so that a high internal phase ratio emulsion of the solution of the polyether in a water continuous phase can be formed;

b) continuously merging into a disperser, in the presence of an emulsifying and stabilizing amount of a surfactant, a flowing stream of water flowing at a rate $r_1$, and a flowing stream containing the solution of the hydroxy-functional polyether flowing at a rate $r_2$;

c) mixing the streams with a sufficient amount of shear to form a high internal phase ratio emulsion;

d) diluting the high internal phase ratio emulsion with water to form the stable aqueous dispersion; and e) removing the solvent from the high internal phase ratio emulsion;

wherein the hydroxy-functional polyether has structural units represented by either of the formulae:

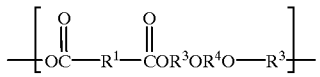

-continued or

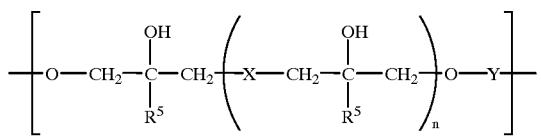

where $R^1$ is predominantly a hydrocarbylene moiety; $R^5$ is independently in each occurrence hydrogen or alkyl; n is 0 or 1; $R^3$ is

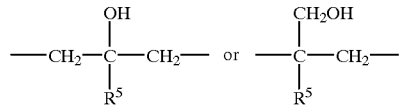

and $R^4$ is

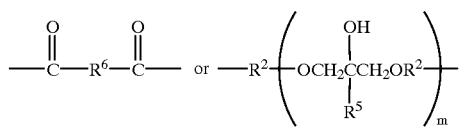

where $R^2$ is predominantly a hydrocarbylene moiety or

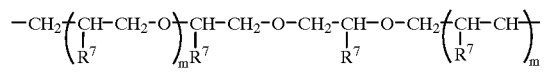

where $R^6$ is predominantly a hydrocarbylene moiety; $R^7$ is independently in each occurrence hydrogen or methyl; X is

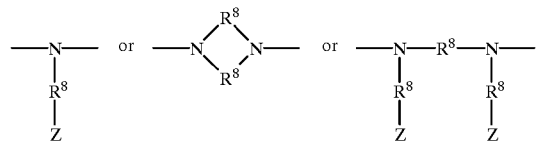

wherein $R^8$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano; Y is predominantly a hydrocarbylene moiety; each m is independently an integer from about 0 to 100; and wherein the ratio of the flow rates $r_2{:}r_1$ is in such a range that the volume average particle size of the high internal phase ratio emulsion is not greater than 3 microns.

The present invention addresses a need in the art by providing an adherent thermoplastic coating that exhibits an excellent barrier to oxygen and carbon dioxide, but which barrier properties are not adversely affected by contact with water. In some embodiments, the composition can provide a biodegradable coating which is particularly useful in paper packaging applications where resistance to spoilage of food and biodegradability are desirable.

BRIEF DESCRIPTION OF DRAWING

FIG. 1 is a graph of the polydispersity ($D_v/D_n$) and volume average particle size (microns) versus the polymer solution:water feed ratio.

DETAILED DESCRIPTION OF THE INVENTION

The thermoplastic hydroxy-functional polyether used to make the HIPR emulsion or the stable aqueous dispersion of the present invention has structural units represented by either of the formulae:

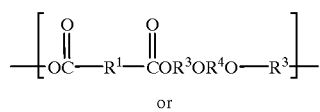

or

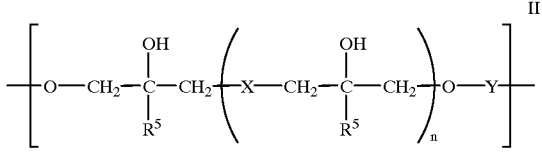

where X is preferably 2-hydroxyethylimino-, 2-hydroxypropylimino-, piperazenyl, N,N'-bis(2-hydroxyethyl)-1,2-ethylenediimino-; Y is preferably isopropylidenediphenylene, 1,3-phenylene, or 1,4-phenylene; $R^3$ is

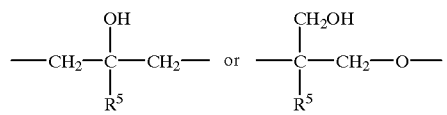

and $R^4$ is

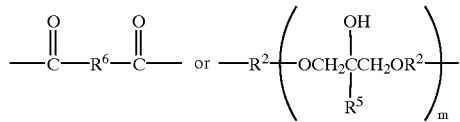

or

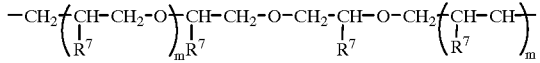

where $R^5$ is preferably hydrogen, and preferably each m is independently an integer from about 0 to 10.

The term "predominantly hydrocarbylene" is used herein to mean a divalent radical that is predominantly hydrocarbon, but which may contain a minor amount of a heteroatomic moiety such as oxygen, sulfur, imino, sulfonyl, and sulfoxyl.

Representative hydrocarbylene moieties useful as $R^1$, $R^2$ and $R^6$ include unsubstituted and hydroxy-substituted hydrocarbylene including alkylene, cycloalkylene, alkylenearylene, poly(alkyleneoxyalkylene), alkylenethioalkylene, alkylenesulfonyl-alkylene, arylene, dialkylenearylene, diaryleneketone, diarylenesulfone, diarylene oxide and diarylene sulfide.

In the more preferred hydroxy-functional polyethers, $R^1$, $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene, 1,2-cyclohexylene, p-phenylene, m-phenylene, o-phenylene, 2,6-naphthalene, diphenyleneisopropylidene, sulfonyldiphenylene, carbonyldiphenylene, oxydiphenylene, or 9,9-fluorenediphenylene.

The poly(hydroxy ester ethers) represented by Formula I can be prepared by reacting diglycidyl esters of aliphatic or aromatic diacids such as diglycidyl terephthalate, or diglycidyl ethers of dihydric phenols or alcohols with aliphatic or aromatic diacids such as adipic or terephthalic acid as described in U.S. Pat. Nos. 5,171,820 and 5,496,910.

The poly(hydroxy amino ether) represented by Formula II (where n=1) can be prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyethers are described in U.S. Pat. No. 5,275,853. These polyethers can also be prepared by contacting a diglycidyl ether or an epihalohydrin with a difunctional amine.

The hydroxy-functional polyether represented by Formula II (where n=0) can also be prepared by contacting a diglycidyl ether or a combination of diglycidyl ethers with a dihydric phenol or combination of dihydric phenols using the process described in U.S. Pat. No. 5,164,472. Alternatively, the hydroxy-functional polyether can be prepared by allowing a dihydric phenol or a combination of dihydric phenols to react with an epihalohydrin by the process described by Reinking, Barnabeo, and Hale in *Journal of Applied Polymer Science*, Vol. 7, pg. 2135 (1963).

A more preferred hydroxy-functional polyether contains structural units formed from the reaction product of the diglycidyl ether of bisphenol A and adipic acid.

The preferred weight average molecular weight of the hydroxy-functional polyether (as determined by gel permeation chromatography) is not less than about 1000 Daltons, more preferably not less than 10,000 Daltons, most preferably not less than 20,000 Daltons, and preferably not more than 250,000 Daltons, more preferably not more than 100,000 Daltons.

The stable aqueous dispersion of the hydroxy-functional polyether can be prepared by any suitable method including those described in U.S. Pat. Nos. 3,360,599; 3,503,917; 4,123,403; 5,037,864; and 5,539,021; the descriptions of which preparations are incorporated herein by reference. Preferably, the stable aqueous dispersion of the hydroxy-functional polyether is prepared by first preparing an HIPR emulsion, then diluting the emulsion with water.

The HIPR emulsion of the hydroxy-functional polyether may also be prepared by any suitable method, such as those described in U.S. Pat. Nos. 4,018,426; 5,250,576; and 5,539,021; the teachings of which preparations are incorporated herein by reference. Preferably, the HIPR emulsion is prepared by continuously merging into a disperser, in the presence of an emulsifying and stabilizing amount of a surfactant, a stream of water flowing at a rate $r_1$, and a stream containing the hydroxy-functional polyether flowing at a rate $r_2$, then mixing the streams with a sufficient amount of shear to form the HIPR emulsion. The ratio of the flow rates $r_2:r_1$ is preferably in such a range that the polydispersity of the HIPR emulsion, defined as the ratio of the volume average particle size to the number average particle size ($D_v/D_n$), is not greater than 3, more preferably not greater than 2, and most preferably not greater than 1.3; or the volume average particle size, as measured using a Coulter LS230 particle size analyzer (Coulter Instruments), is not greater than 3 microns, more preferably not greater than 1 micron, and most preferably not greater than 0.5 micron.

Referring now to FIG. 1, which is a plot of the polydispersity (dotted lines, solid circles) and particle size (solid lines, open circles) versus feed ratio (polymer solution:water), the range of the feed ratio that gives the best results is not less than 3.5, preferably not less than 3.8, and not greater than 4.5, more preferably not greater than 4.4. The polymer solution is a polyhydroxy ester ether (prepared as described in the Example, part B) 45 percent by weight in a 60:40 volume:volume mixture of toluene and 1-butanol. It has surprisingly been discovered that aqueous dispersions of the hydroxy-functional polyether having low particle size and polydispersity can be prepared in the absence of grafted functional groups such as carboxylic acid-containing groups.

The hydroxy-functional polyether is advantageously dissolved in an organic solvent or combination of solvents so that the stream containing the hydroxy-functional polyether has a sufficiently low viscosity to be pumped through a conduit. Alternatively, an otherwise unpumpable hydroxy-functional polyether may be rendered pumpable by the addition of a sufficient amount of heat. Preferably, the hydroxy-functional polyether is dissolved in a solvent or a combination of solvents. The solvent or solvent combination is characterized by providing a solution of the polymer that is sufficiently immiscible with water so that an HIPR emulsion of the solution of the polymer in a water continuous phase can be formed. A preferred solvent is a glycol ether such as propylene glycol methyl ether acetate; a preferred solvent combination is a non-polar solvent and a $C_1$–$C_5$ alcohol, such as a combination of toluene and n-butanol.

The surfactant used to stabilize the HIPR emulsion is preferably anionic or nonionic, or a combination thereof. A preferred nonionic surfactant is a polymeric surfactant having the following structure:

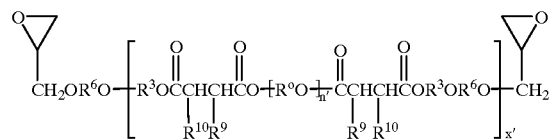

where $R^6$, and $R^3$ are as previously defined; $R^o$ is alkylene, preferably $C_2$–$C_{12}$ alkylene, more preferably ethylene, propylene, or butylene, most preferably ethylene; $R^9$ and $R^{10}$ are each independently H, alkyl or alkenyl, preferably H, $C_1$–$C_{20}$ alkyl or $C_2$–$C_{20}$ alkenyl, more preferably H, $C_1$–$C_{12}$ alkyl or $C_2$–$C_{12}$ alkenyl, most preferably H or 2-dodecene-1-yl; n' and x' are positive integers; and $R^6$ is preferably diphenylene-isopropylidene.

The polymeric surfactant (IV) can be prepared by first reacting a polyoxyalkylene glycol, preferably a polyoxyethylene glycol, with an anhydride at a glycol:anhydride mole:mole ratio of about 1:2 to form a diacid intermediate, then reacting the intermediate with a diglycidyl ether, preferably diglycidyl ether of bisphenol A, using a diglycidyl ether:diacid mole:mole ratio preferably in the range of about 1 to about 2. The reaction scheme is illustrated as follows:

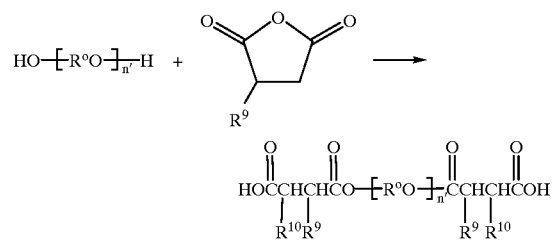

-continued

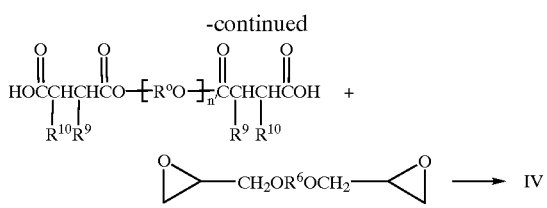

A more preferred surfactant is a combination of the polymeric surfactant (IV) with an anionic surfactant such as sulfonates or sulfates of ethoxylated phenols such as poly(oxy-1,2-ethanediyl)α-sulfo-ω(nonylphenoxy) ammonium salt (available as Rhodapex™ CO 436, a Trademark of Rhone Pôulenc); or dialkyl esters of sodium sulfosuccinic acid such as dioctyl ester of sodium sulfosuccinic acid (available as Aerosol OT 75, Cytec Industries Inc., Division of American Cyanamid) preferably at a anionic surfactant-:polymeric surfactant mole:mole ratio not greater than about 2:1, more preferably not greater than about 1:1.

The HIPR emulsion can be simply diluted with water, preferably with mixing, to form the stable aqueous dispersion. The organic solvent, if present, can then be advantageously removed from the stable aqueous dispersion by any suitable means such as vacuum distillation.

The stable aqueous dispersion of the hydroxy-functional polyether can be used to make a non-chlorine-containing, adherent thermoplastic coating having low oxygen and carbon dioxide transmission rates. The coatings formed from stable aqueous dispersions of poly(hydroxy ester ethers) are especially useful in applications where biodegradability is also desired. Such coatings are useful for food wrapping paper, or containers such as milk or juice cartons, where it would be desirable to lock in freshness and dispose of the container in a compost bin.

The following examples are for illustrative purposes only and are not intended to limit the scope of this invention.

EXAMPLE 1

Preparation of a Stable Aqueous Dispersion of a Hydroxy-functional Polyether by Continuous Process A. Preparation of a Polymeric Surfactant In a round-bottomed flask equipped with a nitrogen inlet, mechanical stirrer and a condenser are added with stirring over 30 minutes, polyethylene glycol 400 (molecular weight 400, 319.5 mmol), polyethylene glycol 4500 (molecular weight 4500, 28.5 mmol), and succinic anhydride (696 mmol). The reactants are heated for 2 hours at 90° C., whereupon Al catalyst (400 ppm of a 70 percent methanolic solution of ethyltriphenylphosphonium acetate complex with acetic acid) and D.E.R.™ 330 (a Trademark of The Dow Chemical Company, 330.5 mmol, epoxy equivalent weight of 180) are added over 90 minutes at 150° C. Stirring at 150° C. is continued for 3.5 hours, whereupon methyl-p-toluenesulfonate (280 ppm) is added. The solution is cooled and the polymeric surfactant is recovered as a yellow wax.

B. Preparation of the Stable Aqueous Dispersion using the Polymeric Surfactant

A hydroxy-functional polyether is prepared from approximately equimolar amounts of the diglycidyl ether of bisphenol A and adipic acid (using substantially the same procedure as described in U.S. Pat. No. 5,496,910, column 6, lines 14–25). A polymer solution is prepared by combining the hydroxy-functional polyether (45 g) with the polymeric surfactant prepared in Part A (4.5 g) in a 60:40 weight-to-weight mixture of toluene and n-butanol (65 g). The polymer solution is pumped continuously through an arm of a 0.5" (1.27-cm) i.d. stainless steel tube, fitted to a first T, at a rate of 35 g/min. Concurrently, Aerosol OT 75 is pumped through an arm of a 0.125" (0.32-cm) polytetrafluoroethylene tubing fitted to the first T at a rate of 0.7 g/min. Water is pumped at the rate of 7.2 g/min through an arm of a second 0.125" (0.32-cm) polytetrafluoroethylene tubing that is fitted to the 0.5" i.d. tube through a second T downstream of the first T. An HIPR emulsion of the polymer in a water-continuous phase is formed by merging and mixing together the polymer-Aerosol OT 75 stream and the water stream under condition of shear using a 4" (10-cm) centrifugal pump, and operating at 1200 rpm. The HIPR emulsion is passed through a second centrifugal pump along with a water diluent to form the stable aqueous dispersion (the latex). The organic solvents are removed from the latex in vacuo to obtain a 50 percent solids latex. The mean volume average particle size of the latex, as measured in a Coulter LS230, is 0.569 micron ($D_v/D_n$=1.3).

What is claimed is:

1. A composition comprising a high internal phase ratio emulsion having water as a continuous phase and a thermoplastic hydroxy-functional polyether as a disperse phase wherein the hydroxy-functional polyether has structural units represented by either of the formulae:

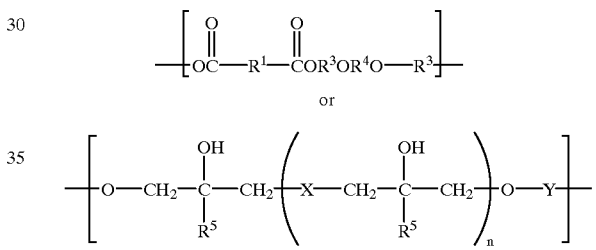

where $R^1$ is predominantly a hydrocarbylene moiety; $R^5$ is independently in each occurrence hydrogen or alkyl; n is 0 or 1; $R^3$ is

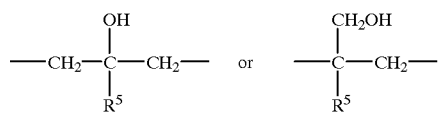

and $R^4$ is

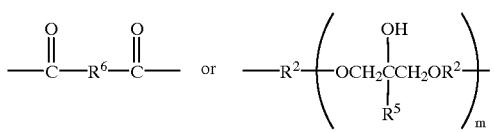

where $R^2$ is predominantly a hydrocarbylene moiety or

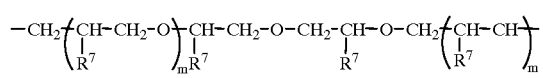

where $R^6$ is predominantly hydrocarbylene; $R^7$ is independently in each occurrence hydrogen or methyl; X is

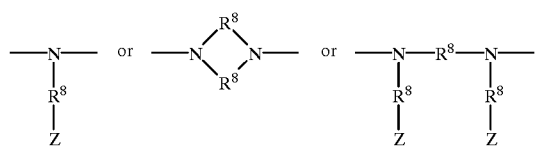

wherein $R^8$ is independently in each occurrence $C_2-C_{20}$ hydrocarbylene; Z is independently in each occurrence H, alkylamido, hydroxyl, alkoxy, alkylcarbonyl, aryloxy, arylcarbonyl, halo, or cyano, Y is predominantly a hydrocarbylene moiety; and each m is independently an integer from about 0 to 100.

2. The composition of claim 1 wherein $R^4$ is

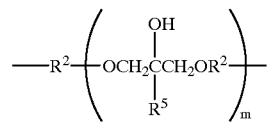

m is 0; $R^1$ is ethylene, propylene, hexamethylene, p-phenylene, or m-phenylene; $R^2$ is p-phenylene, m-phenylene, or diphenylene-isopropylidene; and $R^5$ is H.

3. The composition of claim 1 wherein the hydroxy-functional polyether has structural units represented by the formula:

where $R^1$ is 1,4-cyclohexylene, 1,3-cyclohexylene or 1,2-cyclohexylene, p-phenylene, m-phenylene, 2,6-naphthalene, diphenylene-isopropylidene, sulfonyldiphenylene, carbonyldiphenylene, oxydiphenylene, or 9,9-fluorenediphenylene; and $R^6$ is methylene, ethylene, propylene, butylene, pentamethylene, hexamethylene, heptamethylene, octamethylene, nonamethylene, decamethylene, or dodecamethylene.

4. The composition of claim 3 where $R^1$ is diphenylene-isopropylidene; $R^6$ is tetramethylene; and the weight average molecular weight of the hydroxy-functional polyether is not less than 10,000 Daltons and not greater than 250,000 Daltons.

5. The composition of claim 1 which is prepared by the steps of:
a) dissolving the hydroxy-functional polyether in a solvent or melting the polyether, to form a solution or a melt that is sufficiently immiscible with water so that a high internal phase ratio emulsion of the solution of the polyether in a water continuous phase can be formed;
b) continuously merging into a disperser, in the presence of an emulsifying and stabilizing amount of a surfactant, a flowing stream of water flowing at a rate of $r_1$, and a flowing stream containing the solution of the polyether flowing at a rate $r_2$; and
c) mixing the streams with a sufficient amount of shear to form the high internal phase ratio emulsion, wherein the ratio of the flow rates $r_2:r_1$ is such that the particle size of the high internal phase ratio emulsion is not greater than 3 microns.

6. The composition of claim 5 wherein the surfactant comprises an anionic surfactant and a polymeric nonionic surfactant having the following formula:

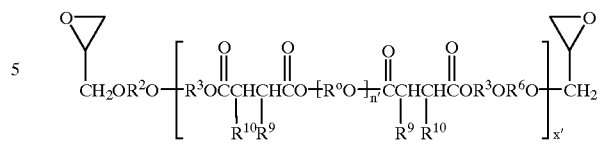

where $R^6$ is predominantly hydrocarbylene; $R^3$ is

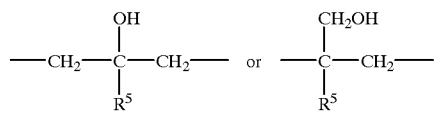

where each $R^5$ is independently in each occurrence hydrogen or alkyl; $R^o$ is $C_2-C_{12}$ alkylene; $R^9$ is H, alkyl, or alkenyl; and n' and x' are positive integers.

7. The composition of claim 6 wherein the anionic surfactant is a sulfonate or sulfate of an ethoxylated phenol or a dialkyl ester of sodium sulfosuccinic acid; $R^6$ is diphenylene-isopropylidene; $R^8$ is ethylene, propylene, or butylene; $R^9$ is H, $C_1-C_{12}$ alkyl, or $C_2-C_{12}$ alkenyl; wherein the mole:mole ratio of the anionic surfactant to the polymeric surfactant is not greater than about 2:1.

8. The composition of claim 7 wherein the anionic surfactant is a dioctyl ester of sodium sulfosuccinic acid; $R^9$ is 2-dodecene-1-yl or H, and $R^8$ is ethylene; wherein the mole:mole ratio of the anionic surfactant to the polymeric surfactant is not greater than about 1:1.

9. A composition comprising a stable aqueous dispersion of a thermoplastic hydroxy-functional polyether having structural units represented by either of the formulae:

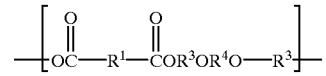

or

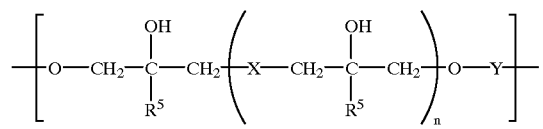

where $R^1$ is predominantly a hydrocarbylene moiety; $R^5$ is independently in each occurrence hydrogen or alkyl; n is 0 or 1; $R^3$ is

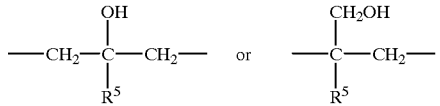

and $R^4$ is

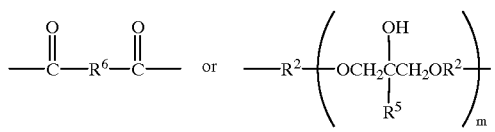

where $R^2$ is predominantly a hydrocarbylene moiety or

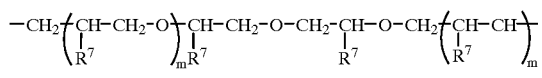

where $R^6$ is predominantly hydrocarbylene; $R^7$ is independently in each occurrence hydrogen or methyl; X is

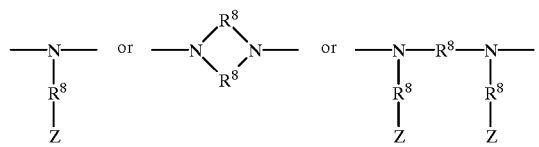

wherein $R^8$ is independently in each occurrence $C_2$–$C_{20}$ hydrocarbylene; Z is independently in each occurrence H, alkylamido, hydroxyl, alkoxy, alkylcarbonyl, aryloxy, arylcarbonyl, halo, or cyano; Y is predominantly a hydrocarbylene moiety; and each m is independently an integer from about 0 to 100, which composition is stabilized by an emulsifying and stabilizing amount of a surfactant.

10. The composition of claim 9 wherein the hydroxy-functional polyether has structural units represented by the formula:

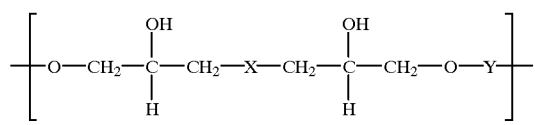

where X is

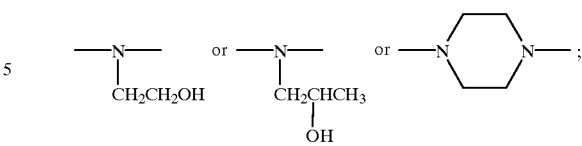

and Y is isopropylidenediphenylene, 1,3-phenylene, or 1,4-phenylene, wherein the weight average molecular weight of the polymer is not less than 1000 and not more than 100,000 Daltons.

11. The composition of claim 9 wherein hydroxy-functional polyether has structural units represented by the formula:

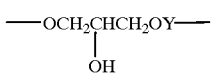

where Y is isopropylidenediphenylene, 1,3-phenylene, or 1,4-phenylene, and the weight average molecular weight of the polymer is not less than 1000 and not more than 100,000 Daltons.

12. The composition of claim 11 which is formed by the reaction of a bisphenol with a diglycidyl ether or an epihalohydrin.

\* \* \* \* \*